United States Patent [19]

Field et al.

[11] Patent Number: 4,851,480
[45] Date of Patent: Jul. 25, 1989

[54] EXTRUSION-GRADE COMPOSITIONS COMPRISING MIXTURES OF WHOLLY AROMATIC POLYESTERS

[75] Inventors: Nathan D. Field, Augusta; Joseph J. Duska, Martinez, both of Ga.

[73] Assignee: Amoco Corporation, Chicago, Ill.

[21] Appl. No.: 60,038

[22] Filed: Jun. 9, 1987

[51] Int. Cl.$^4$ .............................................. C08L 67/02
[52] U.S. Cl. .................................... 525/444; 524/539
[58] Field of Search ............................................ 525/444

[56] References Cited

U.S. PATENT DOCUMENTS

| | | | |
|---|---|---|---|
| 3,637,595 | 1/1972 | Cottis et al. | 528/193 |
| 3,975,487 | 8/1976 | Cottis et al. | 264/210 F |
| 4,267,289 | 5/1981 | Froix | 525/444 |
| 4,414,365 | 11/1983 | Sugimoto | 525/437 |
| 4,563,508 | 1/1986 | Cottis | 525/444 |
| 4,640,961 | 2/1987 | Saito | 525/444 |

*Primary Examiner*—Patricia Short
*Attorney, Agent, or Firm*—Jones, Askew & Lunsford

[57] ABSTRACT

This invention relates to extrusion-grade compositions comprising mixtures of wholly aromatic polyesters. These compositions can be extruded into smooth films and sheets having good properties and pleasing visual appearances.

6 Claims, No Drawings

EXTRUSION-GRADE COMPOSITIONS COMPRISING MIXTURES OF WHOLLY AROMATIC POLYESTERS

This invention relates to extrusion-grade compositions. More particularly, this invention relates to such compositions comprising mixtures of wholly aromatic polyesters.

Wholly aromatic polyesters are well known in the prior art, such as Cottis et al. U.S. Pat. No. 3,637,595. Because of their good properties at high temperatures, these polyesters are useful for molding articles which are exposed to high temperatures, such as ovenware.

However, these wholly aromatic polyesters can be difficult to extrude into acceptable products, such as films and sheets. These extruded products frequently have properties and visual appearances which are less than desirable.

Accordingly, an object of this invention is to provide extrusion-grade compositions.

Another object of this invention is to provide extrusiongrade compositions which can be extruded into useful film and sheets having good properties and visual appearances.

Another object of this invention is to provide extrusiongrade compositions which comprise mixtures of wholly aromatic polyesters.

These and other objects, features and advantages of this invention will become apparent from the following detailed description.

We have surprisingly found that wholly aromatic polyesters, each having good properties at high temperatures but each being difficult to extrude into acceptable products, can be mixed to provide extrusion-grade compositions. Films and sheets, which are extruded from these compositions, retain the good high temperature properties of the wholly aromatic polyesters.

In accordance with the present invention, extrusion-grade compositions are provided which comprise a mixture of:

A. from about 50 to about 70 percent, by weight, of a first wholly aromatic polyester having a compressive flow value of at least 25 and comprising repeating units derived from terephthalic acid, p-hydroxybenzoic acid and 4,4'-biphenol; and B. from about 30 to about 50 percent, by weight, of a second wholly aromatic polyester having a compressive flow value in the range of 25–100 and comprising repeating units derived from terephthalic acid, p-hydroxybenzoic acid and 4,4'-biphenol;

wherein the molar amount of p-hydroxybenzoic acid in the second polyester is higher than in the first polyester.

The compositions provided by this invention can be extruded by conventional techniques into useful films and sheets.

This invention provides a mixture of at least two different wholly aromatic polyesters (designated as the first and second polyesters). Each of these polyesters has a melting temperature of at least 300° C. and is prepared by reacting terephthalic acid, p-hydroxybenzoic acid and 4,4'-biphenol.

Although the first and second polyesters may be prepared from identical reactants, the second polyester is prepared from a higher mole percent of p-hydroxybenzoic acid. The first polyester preferably is prepared from about 25 mole percent of terephthalic acid, about 50 mole percent of p-hydroxybenzoic acid and about 25 mole percent of 4,4'-biphenol. The second polyester preferably is prepared from about 17.5 mole percent of terephthalic acid, about 65 mole percent of p-hydroxybenzoic acid and about 17.5 mole percent of 4,4'-biphenol.

With regard to a mixture comprising two polyesters, the mixture contains from about 50 to about 70 percent, by weight, of the first polyester and from about 30 to about 50, by weight, of the second polyester.

The compositions of this invention may contain small amounts of one or more additional materials without adversely affecting extrudability. These materials may include fillers (such as talc, titanium dioxide, aluminum powder, calcium sulfate, wollastonite, inorganic pigments, inorganic silicates and carbon black) and flow modifiers (as described in Cottis et al. U.S. Pat. No. 4,563,508). These materials may be present in a total amount of about 1 to about 5 percent, by weight.

All percentages specified in this application are by weight unless otherwise stated.

The terms Melt Flow Rate and Compressive Flow Value used in this application are defined as follows:

Melt Flow Rate is determined by ASTM D1238 and refers to the rate of extrusion in grams/10 mins of the molding composition. The conditions under which the moulding compositions of this invention are tested is to pass the composition through an 0.0825 inch diameter orifice (which is 0.315 inch in length) under a 5000 gram load at 410° C.

The extrusion-grade compositions of this invention have a melt flow rate in the range of about 0.15 to about 0.3 when measured at 410° C. Preferably, the melt flow rate is in the range of about 0.2 to 0.3.

Compressive Flow (CF) is a measure of the flow of a weighed sample when pressed on a Carver press at 5000 pounds. CF is measured from the area of a disc obtained from a sample of powdered material of given weight, usually 0.5 to 1.0 grams, which has been pressed between two parallel plates. In carrying out the determination of this characteristic, a sample is pressed between two sheets of aluminum foil which in turn are backed by chromium plated steel plates 6"×6"×¼". A Carver 2112-X Model No. 150-C hydraulic press modified for 800° F. is used to press the sample. The particular temperature of the press is that indicated in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for the pressure of the applied load and that number is multiplied by 100 to give a number greater than 1. The compressive flow is then calculated by means of the following equation:

$CF =$ $$\left[\frac{\left|\frac{\text{Wt. of circle (sandwich)} - \text{wt. of sample}}{\text{Foil wt. factor}} \times 50\right|^2}{\text{Applied load (Kg)} \times \text{wt. of sample}}\right] \times 100$$

The first wholly aromatic polyester has a CF value of at least 25, while the second wholly aromatic polyester has a CF value in the range of 25–100 (preferably 50–80).

This invention is further illustrated by the following examples which are illustrative of certain embodiments designed to teach those of ordinary skill in the art how to practice this invention and to represent the best mode contemplated for carrying out this invention.

EXAMPLES 1–11

A first wholly aromatic polyester is prepared from 25 mole percent terephthalic acid, 50 mole percent p-hydroxybenzoic acid and 25 mole percent 4,4′-biphenol according to the procedure of Example 1 in Cottis et al. U.S. Pat. No. 4,563,508. This polyester is then ground to an average particle size of approximately 50 mesh.

A second wholly aromatic polyester is prepared by reacting 1638 parts of terephthalic acid, 5039 parts of p-hydroxybenzoic acid, 1837 parts of 4,4′-biphenol, 6600 parts of acetic anhydride, and 0.5 parts of potassium sulfate. The mixture is heated to 307° C. over a period of 10 hours with distillation of acetic acid, then 6.6 parts of distearyl pentaerythritol diphosphite is added. Heating is continued for 6 minutes to a melt temperature of 310° C. The mixture is transferred to a mechanical mixer that initially is at a temperature of 335° C. and then raised to 350° C. After 9.5 hours of mixing, the contents are cooled to room temperature. During this period, the liquid changes to a solid having a compressive flow of 52. This polyester is then ground to an average particle size of approximately 50 mesh.

In Examples 1–11, the first and second polyesters are mixed in a high intensity mixer. The resulting mixture is fed by means of a gravimetric powder feeder into the hopper of a 25 mm. corotating intermeshing vented twin screw extruder. The barrel temperature zones are maintained at 425°–435° C. with a die temperature setting of 390°–400° C. and a vacuum of 15 inches mercury on the vent. The screw speed of 150 rpm, and the total throughput is approximately 15 lbs. per hour. The hot extrudate is pelletized, conveyed, cooled and packaged.

The pellets are used to form films and sheets, by conventional extrusion techniques. The test results are shown in the following Table.

| Example | First Polyester (%) | Second Polyester (%) | Acceptable Extruded Film & Sheets | Melt Flow Rate at 410° C. |
|---|---|---|---|---|
| 1 | 100 | 0 | No | 0.0 |
| 2 | 90 | 10 | No | 0.0 |
| 3 | 80 | 20 | No | 0.0 |
| 4 | 70 | 30 | Yes | 0.15 |
| 5 | 60 | 40 | Yes | 0.20 |
| 6 | 50 | 50 | Yes | 0.22 |
| 7 | 40 | 60 | No | 0.28 |
| 8 | 30 | 70 | No | 0.20 |
| 9 | 20 | 80 | No | 0.20 |
| 10 | 10 | 90 | No | 0.29 |
| 11 | 0 | 100 | No | 0.18 |

The foregoing description relates to certain embodiments of this invention, and modifications or alterations may be made without departing from the spirit and scope of this invention as set forth in the claims.

1. An extrusion-grade composition comprising a mixture of:
   A. from about 50 to about 70 percent, by weight, of a first wholly aromatic polyester having a compressive flow value of at least 25 and comprising repeating units derived from terephthalic acid, p-hydroxybenzoic acid and 4,4′-biphenol; and
   B. from about 30 to about 50 percent, by weight, of a second wholly aromatic polyester having a compressive flow value in the range of 25–100 and prepared from about 17.5 mole percent terephthalic acid, about 65 mole percent p-hydroxybenzoic acid and about 17.5 mole percent 4,4′-biphenol;
   wherein the molar amount of p-hydroxybenzoic acid in the second polyester is higher than in the first polyester.

2. A film extruded from a composition as defined by claim 1.

3. A sheet extruded from a composition as defined by claim 1.

4. An extrusion-grade composition comprising a mixture of:
   A. from about 50 to about 70 percent, by weight, of a first wholly aromatic polyester having a compressive flow value of at least 25 and prepared from about 25 mole percent terephthalic acid, about 50 mole percent p-hydroxybenzoic acid and about 25 mole percent 4,4′-biphenol; and
   B. from about 30 to about 50 percent, by weight, of a second wholly aromatic polyester having a compressive flow in the range of 25–100 and prepared from about 17.5 mole percent terephthalic acid, about 65 mole percent p-hydroxybenzoic acid and about 17.5 mole percent 4,4′-biphenol.

5. A film extruded from a composition as defined by claim 4.

6. A sheet extruded from a composition as defined by claim 4.

* * * * *